(12) United States Patent
Duval

(10) Patent No.: US 10,911,587 B1
(45) Date of Patent: Feb. 2, 2021

(54) UNIVERSAL GRIP BAND ASSEMBLY

(71) Applicant: Bennett A. Duval, Santa Monica, CA (US)

(72) Inventor: Bennett A. Duval, Santa Monica, CA (US)

(*) Notice: Subject to any disclaimer, the term of this patent is extended or adjusted under 35 U.S.C. 154(b) by 0 days.

(21) Appl. No.: 17/078,636

(22) Filed: Oct. 23, 2020

(51) Int. Cl.
  *H04M 1/02* (2006.01)
  *H04B 1/3888* (2015.01)
(52) U.S. Cl.
  CPC .................... *H04M 1/0281* (2013.01)
(58) Field of Classification Search
  CPC ................ H04M 1/00; H04M 1/0281
  USPC ........................................................ 455/575.6
  See application file for complete search history.

(56) References Cited

U.S. PATENT DOCUMENTS

| 9,362,968 | B1* | 6/2016 | Haymond | H04B 1/385 |
| 9,671,064 | B2* | 6/2017 | Tussy | F16M 13/04 |
| 2010/0222118 | A1* | 9/2010 | Interdanato | A45F 5/00 |
| | | | | 455/575.6 |
| 2012/0299318 | A1* | 11/2012 | Murphy | A45F 5/00 |
| | | | | 294/25 |

* cited by examiner

*Primary Examiner* — Lee Nguyen
(74) *Attorney, Agent, or Firm* — Dennis L. Thomte; Thomte Patent Law Office LLC

(57) ABSTRACT

A universal grip band assembly for a mobile communication device is provided to prevent the user of the mobile communication device from dropping the mobile communication device. The assembly includes a backing plate which is adhesively secured to the back side of the mobile communication device. A flexible and rectangular-shaped band is selectively removably secured to the backing plate which enables the user to insert his or her fingers between the flexible band and the backing plate to securely grip the mobile communication device. The flexible band may be disconnected from the backing plate so that the band may be replaced upon being worn out or may be replaced with different bands having different colors.

5 Claims, 6 Drawing Sheets

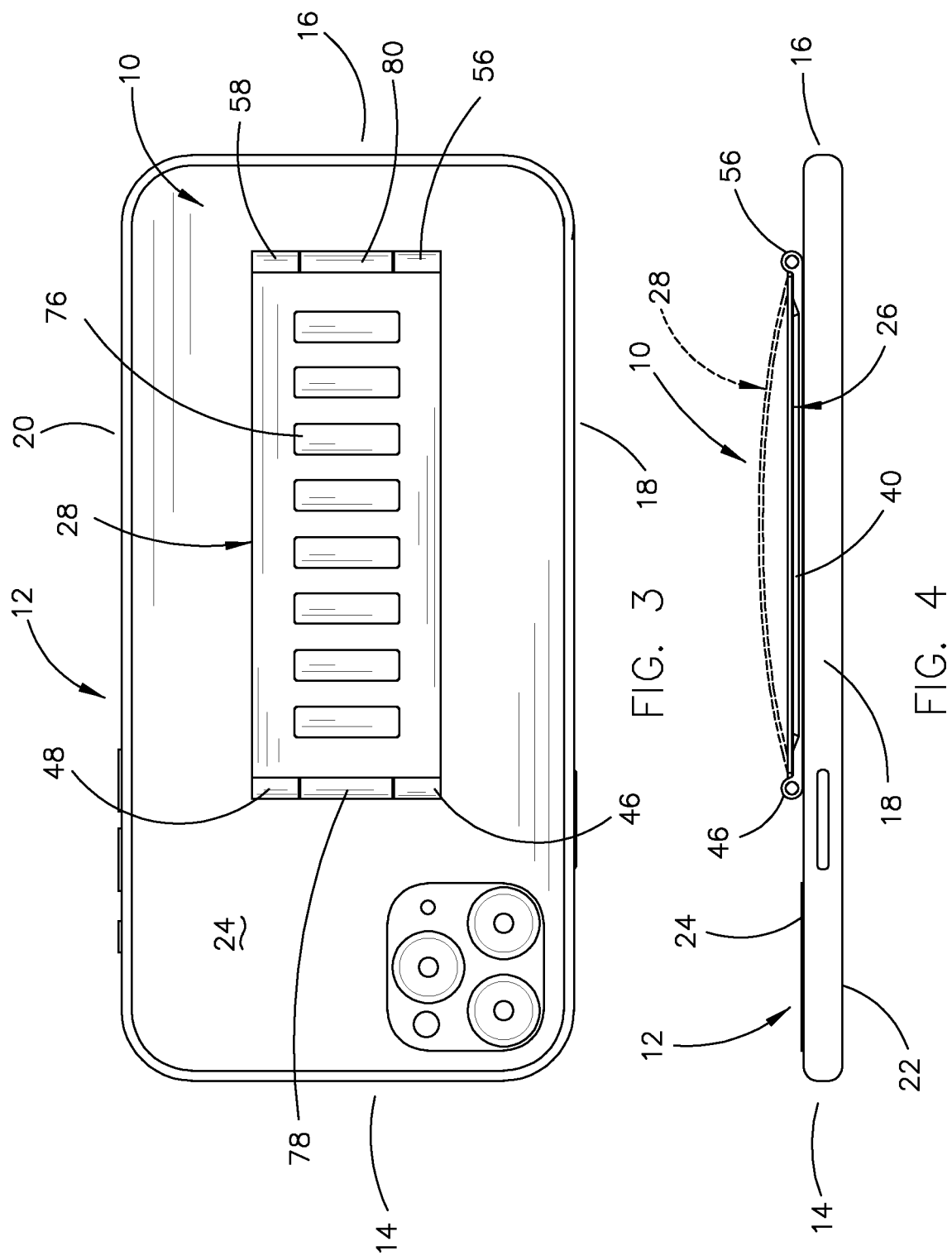

UNIVERSAL GRIP BAND ASSEMBLY

BACKGROUND OF THE INVENTION

Field of the Invention

This invention relates to a universal grip band assembly for attachment to a mobile communication device such as a cell phone, tablet, etc., to prevent the user from dropping the mobile communication device and damaging the same. More particularly, this invention relates to a universal grip band assembly which will fit onto a majority of mobile communication devices. Even more particularly, this invention relates to a universal grip band assembly wherein the backing plate thereof is selectively interchangeably secured to the back of the mobile communication device and wherein the grip band of this invention is selectively interchangeably secured to the backing plate thereof.

Description of the Related Art

Mobile communication devices such as cell phones, tablets, etc., are usually hand-held and are frequently dropped which damages the expensive device. Many types of strap accessories have been previously provided to provide a means for a person to grip the mobile communication device. Some of the strap accessory devices require that the back plate of the mobile communication device be replaced. Other devices do not permit the strap thereof to be easily interchanged.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A universal grip band assembly is provided for a mobile communication device having a front side and a back side. The grip band assembly includes a rectangular backing plate having an upper end, a lower end, a first side edge, a second side edge, a back side and a front side has its back side selectively interchangeably secured to the back side of the mobile communication device.

A first pin mount, having inner and outer ends, is formed at the upper end of the backing plate at the first side edge thereof. The first pin mount has a pin opening formed therein which extends therethrough. A second pin mount, having inner and outer ends, is formed at the upper end of the backing plate at the second side edge thereof. The second pin mount has a pin opening formed therein which extends therethrough.

A third pin mount, having inner and outer ends, is formed at the lower end of the backing plate at the first side edge thereof. The third pin mount has a pin opening formed therein which extends therethrough. A fourth pin mount, having inner and outer ends, is formed in the lower end of the backing plate at the second side edge thereof. The fourth pin mount has a pin opening formed therein which extends therethrough.

The grip band assembly also includes an elongated and flexible rectangular grip band is provided having an upper end, a lower end, an inner side, an outer side, a first side and a second side. The upper end of the grip band has an elongated and hollow first cylindrical sleeve portion having first and second ends. The first cylindrical sleeve portion of the grip band is positioned between the first and second pin mounts. An elongated first pin having a first end and a second end is provided with the first pin being positioned in the first cylindrical sleeve portion at the upper end of the grip band. The first end of the first pin is received in the pin opening in the first pin mount and the second end of the first pin is received in the pin opening of the second pin mount. The lower end of the grip band has an elongated and hollow second cylindrical sleeve portion having first and second ends. The second cylindrical sleeve portion of the grip band is positioned between the third and fourth pin mounts. An elongated second pin having a first end and a second end is provided with the second pin being positioned in the second cylindrical sleeve portion at the lower end of the grip band. The first end of the second pin is received in the pin opening in the third pin mount and the second end of the second pin is received in the pin opening in the fourth pin mount.

In the preferred embodiment, the backing plate is comprised of a polycarbonate material and the grip band is preferably comprised of a silicone, nylon or other readily available materials on the market. The grip band is mounted with respect to the backing plate so that the grip band may be easily interchanged. Preferably, the band has a plurality of spaced-apart rectangular openings formed therein.

It is therefore a principal object of the invention to provide a universal grip band assembly for a mobile communication device.

A further object of the invention is to provide a grip band assembly for a mobile communication device wherein the grip band assembly is selectively adhesively secured to the back side of the mobile communication device.

A further object of the invention is to provide a grip band assembly for a mobile communication device wherein the grip band thereto is easily interchangeably secured to the backing plate thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a top view of the universal grip band assembly of this invention mounted on the back of a cell phone;

FIG. 4 is a side view of the grip band assembly of this invention which is mounted on the cell phone of FIG. 3 with the broken lines illustrating the grip band of this invention being moved away from the backing plate of this invention;

DESCRIPTION OF THE PREFERRED EMBODIMENT

Figure 1:
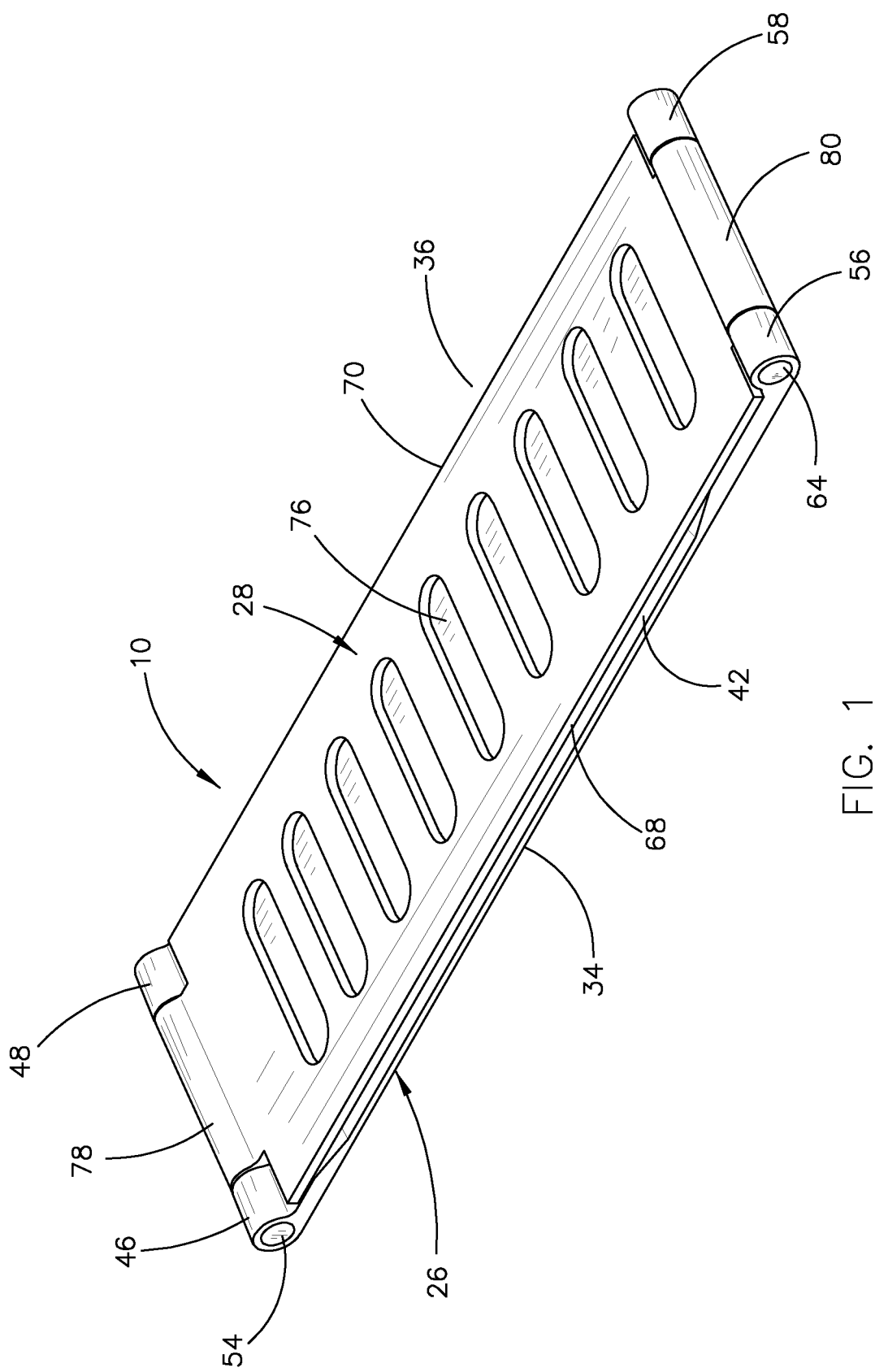
FIG. 1 is a perspective view of the universal grip band assembly of this invention.
Figure 2:
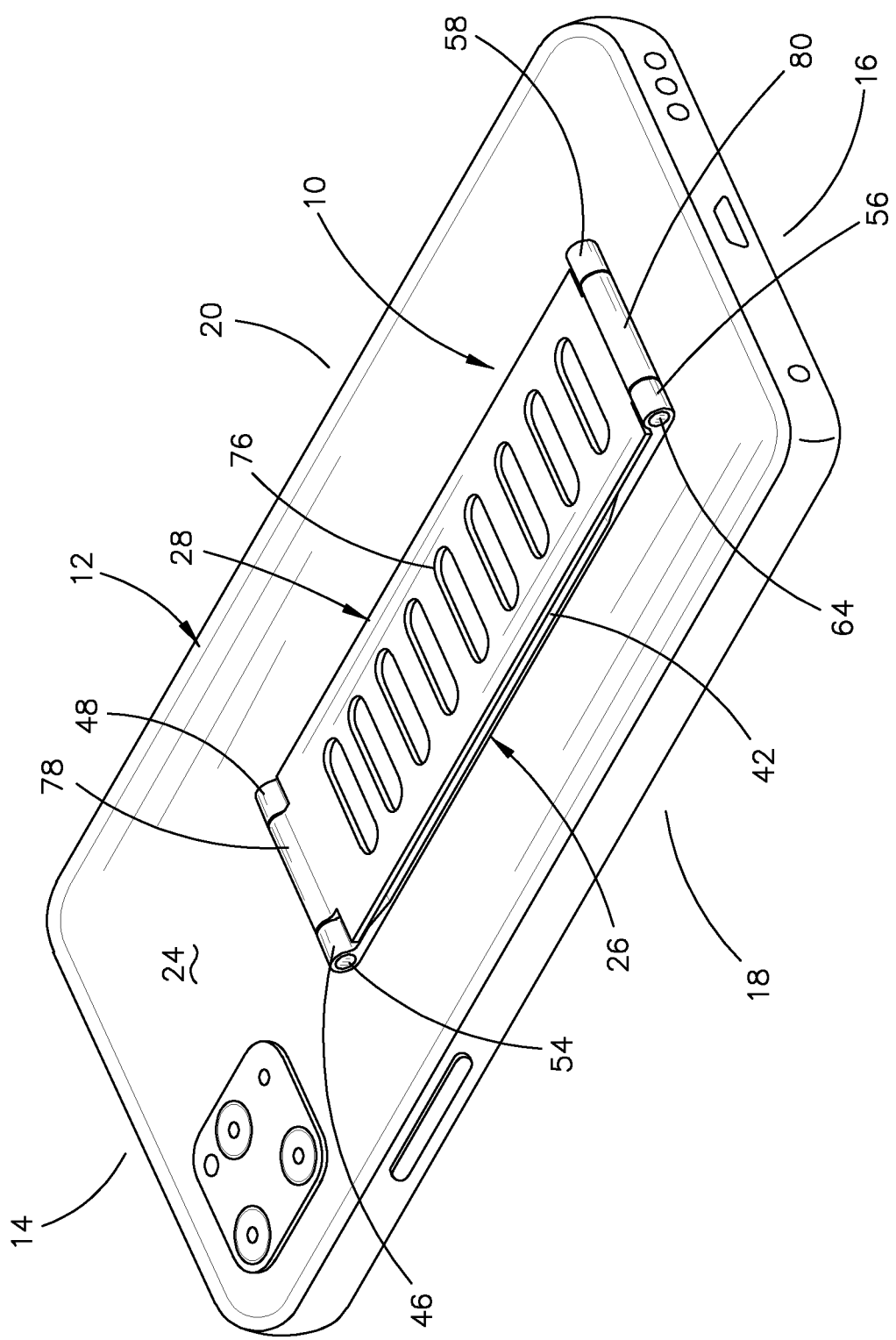
FIG. 2 is a perspective view of the universal grip band assembly of this invention mounted on the back of a cell phone.
Figure 5:
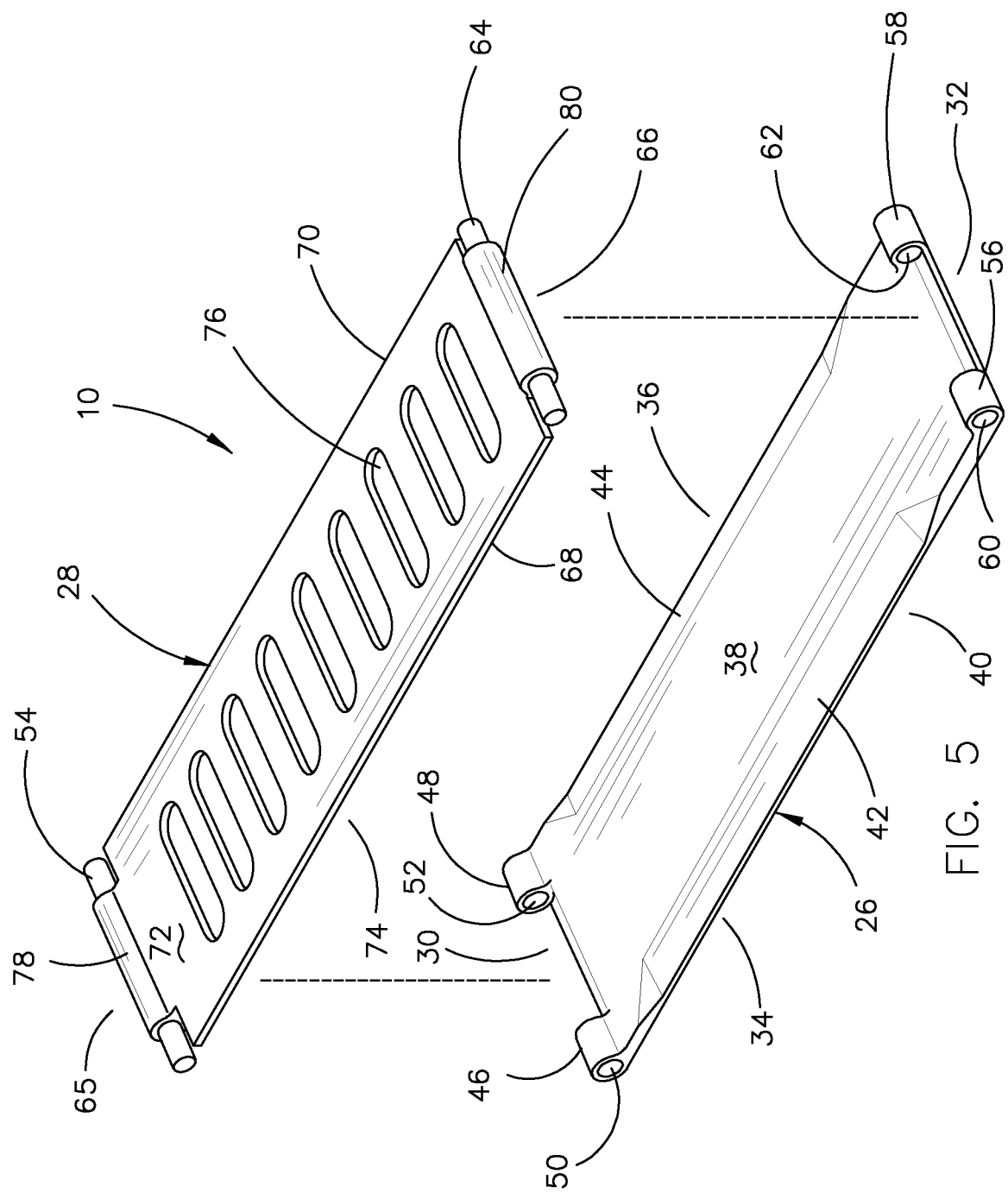
FIG. 5 is an exploded perspective view of the universal grip band assembly of this invention.
Figure 6:
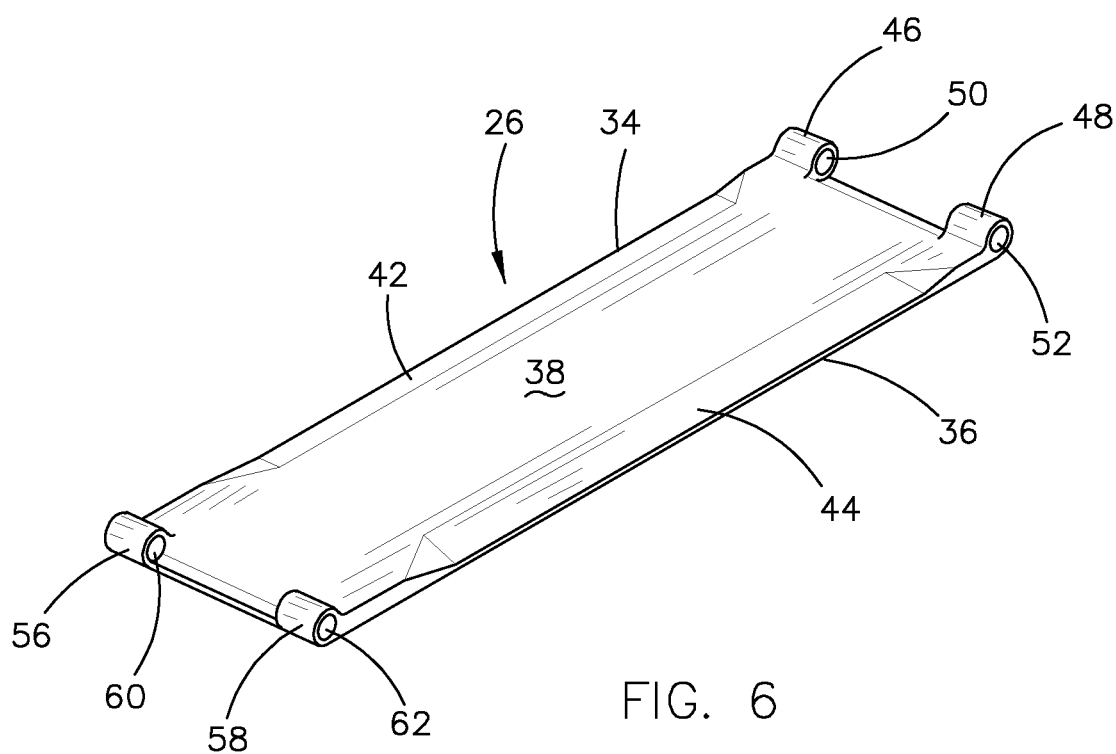
FIG. 6 is a perspective view of the outer or front side of the backing plate of this invention.
Figure 7:
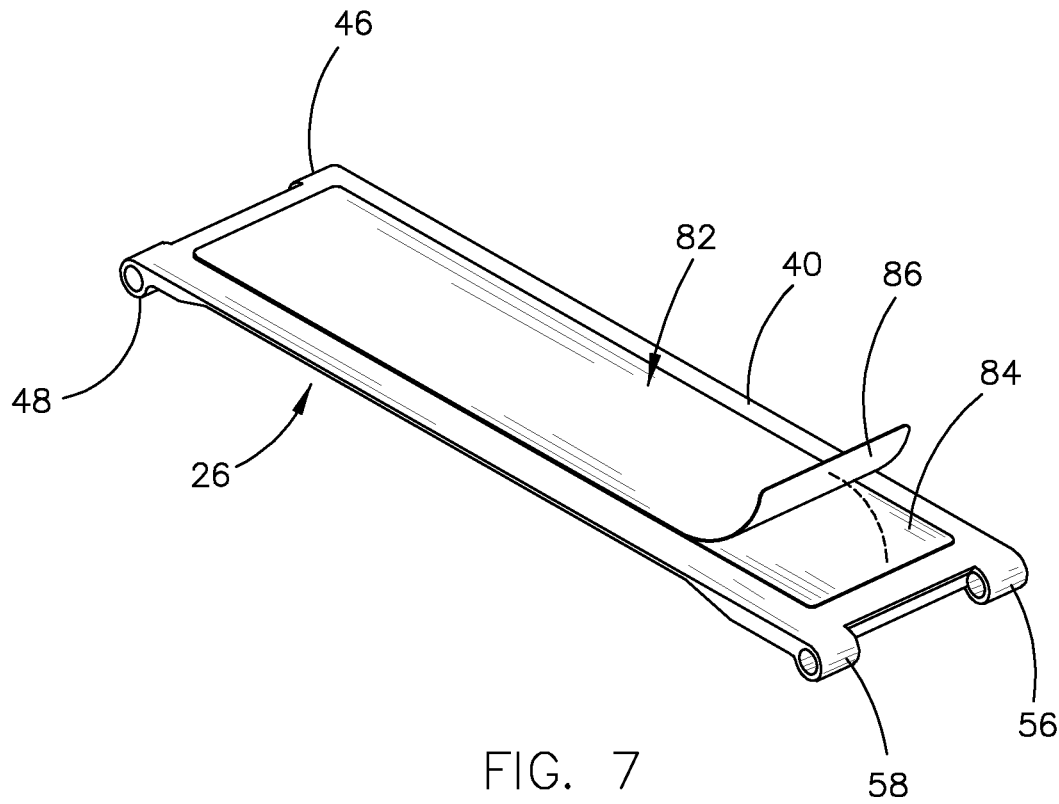
FIG. 7 is a perspective view of the inner or rear side of the backing plate of this invention having a double-faced adhesive tape strap secured thereto with the liner being removed from the outer side of the tape.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The universal grip band assembly of this invention is referred to by the reference numeral 10. The numeral 12 refers to a mobile communication device which in this case is a cell phone. The device 12 could be a tablet or other mobile communication device. Device 12 has an upper end 14, a lower end 16, a first side 18, a second side 20, a front side 22 and a back side 24.

The universal grip band assembly 10 of this invention includes a rectangular backing plate 26 and a flexible rectangular-shaped band 28. Backing plate 26 is preferably comprised of a flexible polycarbonate material. Backing plate 26 includes an upper end 30, a lower end 32, a first side 34, a second side 36, a front side 38 and a back side 40. Backing plate 26 preferably has an elongated and tapered portion 42 formed therein at side 34 thereof. Backing plate 26 preferably has an elongated and tapered portion 44 formed therein at side 36 thereof. Backing plate 26 has spaced-apart pin mounts 46 and 48 formed at the upper end 30 thereof. Pin mounts 46 and 48 have pin openings 50 and 52 formed therein respectively. The numeral 54 refers to an elongated pin which has its ends selectively removably received in pin openings 50 and 52 in pin mounts 46 and 48 respectively.

Backing plate 26 has spaced-apart pin mounts 56 and 58 formed at the lower end 32 thereof. Pin mounts 56 and 58 have pin openings 60 and 62 formed therein respectively. An elongated pin 64 has its ends selectively removably received in pin openings 60 and 62 in pin mounts 56 and 58 respectively.

As seen, band 28 is rectangular-shaped and is flexible. Band 28 includes an upper end 65, a lower end 66, a first side edge 68, a second side edge 70, a front side 72 and a back side 74. Band 28 preferably has a plurality of elongated and vertically spaced-apart openings or slots 76 formed therein. The upper end 65 of band 28 has a hollow and cylindrical sleeve portion 78 formed therein, the length of which is slightly less than the distance between the pin mounts 46 and 48 so that the sleeve portion 78 may be selectively positioned between the mounts 46 and 48. Pin 54 extends through sleeve portion 78 with the ends of pin 54 being received by pin openings 60 and 62 in mounts 46 and 48 respectively to secure the upper end 65 of band 28 to backing plate 26.

The lower end 66 of band 28 has a hollow and cylindrical sleeve portion 80 formed therein, the length of which is slightly less than the distance between mounts 56 and 58 so that sleeve portion 80 may be selectively positioned between the mounts 56 and 58. Pin 64 extends through sleeve portion 80 with the ends of pin 64 being received by pin openings 60 and 62 in mounts 56 and 58 respectively to secure the lower end 66 of band 28 to backing plate 26. The numeral 82 refers to a strip of double sided adhesive tape including a strip of double faced adhesive carrier 84 and a liner 86. One side of carrier 84 is adhesively secured to the back side 40 of backing plate 26. When the liner 86 is removed, the backing plate 26 may be adhesively secured to the back side 24 of the device 12. The double sided adhesive tape 82 enables the grip band 10 to be removed from the device 12 so that another grip band 10 may be interchanged for the removed grip band 10.

Figure 8:
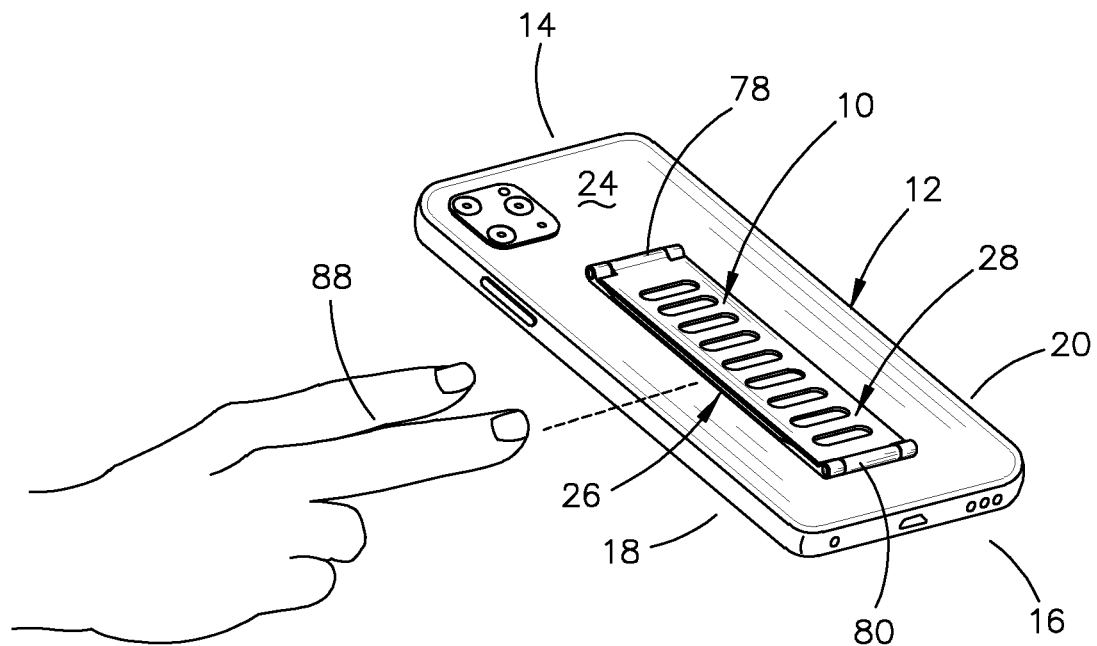
FIG. 8 is a perspective view illustrating a hand about to grip the universal grip band assembly of this invention secured to a cell phone.
Figure 9:
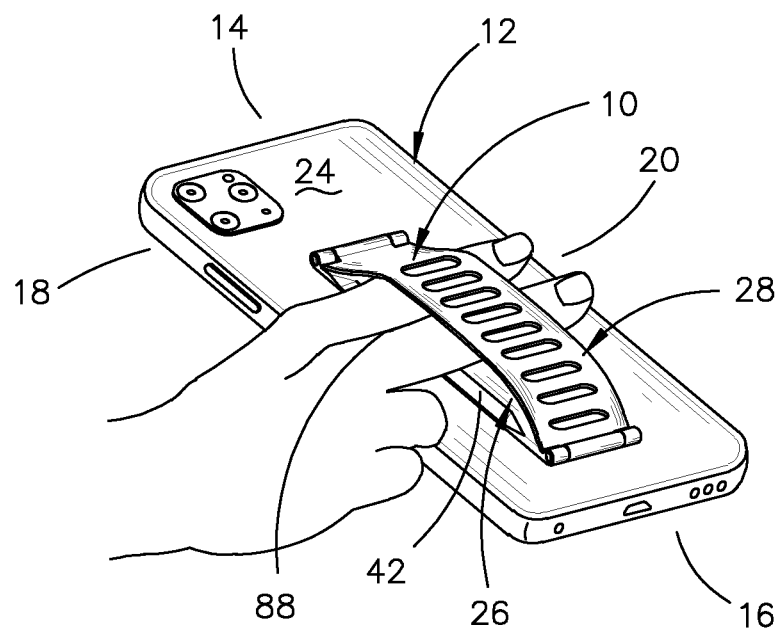
FIG. 9 is a perspective view illustrating the user's hand gripping the universal grip band assembly and the cell phone.

FIGS. 8 and 9 illustrate the manner in which the universal grip band of this invention is used. The user extends his or her fingers 88 between the band 28 and the backing plate 26 from one side thereof. The tapered portion 42 at one side of the backing plate 26 permits the user to easily insert his or her fingers 88 between the backing plate 26 and the band 28. The user may insert two or more fingers 88 between the flexible band 28 and backing plate 26 and will also grasp the device 12 thereby preventing the device 12 from being dropped.

The band 28 may be easily replaced with bands 28 of different colors and materials. If the band 28 becomes worn out, it may be easily replaced. If the user desires to replace the entire grip band assembly from the device 12, the backing plate 26 may be removed from the device 12.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A grip band assembly for attachment to a mobile communication device having a front side and a back side; comprising:

a rectangular backing plate having an upper end, a lower end, a first side edge, a second side edge, a back side and a front side;

said back side of said backing plate being adhesively secured to the back side of the mobile communication device;

a first pin mount, having inner and outer ends, positioned at said upper end of said backing plate at said first side edge of said backing plate;

said first pin mount having a pin opening formed therein which extends inwardly into said inner end thereof;

a second pin mount, having inner and outer ends, positioned at said upper end of said backing plate at said second side edge of said backing plate;

said second pin mount having a pin opening formed therein which extends inwardly into said inner end thereof;

said inner ends of said first and second pin mounts being spaced apart;

a third pin mount, having inner and outer ends, positioned at said lower end of said backing plate at said first side edge of said backing plate;

said third pin mount having a pin opening formed therein which extends inwardly into said inner end thereof;

a fourth pin mount, having inner and outer ends, positioned at said lower end of said backing plate at said second side edge of said backing plate;

said fourth pin mount having a pin opening formed therein which extends inwardly into said inner end thereof;

said inner ends of said third and fourth pin mounts being spaced apart;

an elongated and flexible rectangular-shaped grip band having an upper end, a lower end, an inner side, an outer side, a first side and a second side;

said upper end of said grip band including an elongated and hollow first cylindrical sleeve portion having first and second ends;

said first cylindrical sleeve portion of said grip band being positioned between said inner ends of said first and second pin mounts;

an elongated first pin having a first end and a second end;

said first pin being positioned in said first cylindrical sleeve portion of said grip band;

said first end of said first pin being received in said pin opening in said first pin mount;

said second end of said first pin being received in said pin opening in said second pin mount;

said lower end of said grip band including an elongated and hollow second cylindrical sleeve portion thereon having first and second ends;

said second cylindrical sleeve portion of said grip band being positioned between said inner ends of said third and fourth pin mounts;

an elongated second pin having a first end and a second end;

said second pin being positioned in said second cylindrical sleeve portion of said grip band;

said first end of said second pin being received in said pin opening in said third pin mount; and said second end of said second pin being received in said pin opening in said fourth pin mount.

2. The grip band accessory of claim 1 wherein said first end of said first pin is selectively removably received in said pin opening in said first pin mount and wherein said second end of said first pin is selectively removably received in said second pin opening in said second pin mount and wherein said first end of said second pin is selectively removably received in said pin opening in said third pin mount and wherein said second end of said second pin is selectively removably received in said pin opening in said fourth pin mount.

3. The grip band accessory of claim 1 wherein said backing plate is comprised of a polycarbonate material.

4. The grip band accessory of claim 1 wherein said grip band has a plurality of spaced-apart rectangular openings formed therein.

5. The grip band accessory of claim 1 wherein said front side of said backing plate has an elongated tapered portion formed therein at first side edge thereof and wherein said front side of said backing plate has an elongated tapered portion formed therein at said second side edge thereof.

* * * * *